(12) United States Patent
Wan

(10) Patent No.: US 11,075,542 B2
(45) Date of Patent: Jul. 27, 2021

(54) DEVICE TO-BE-CHARGED, WIRELESS CHARGING APPARATUS, AND WIRELESS CHARGING METHOD

(71) Applicant: Guangdong Oppo Mobile Telecommunications Corp., Ltd., Guangdong (CN)

(72) Inventor: Shiming Wan, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 7 days.

(21) Appl. No.: 16/551,573

(22) Filed: Aug. 26, 2019

(65) Prior Publication Data

US 2019/0379245 A1 Dec. 12, 2019

Related U.S. Application Data

(63) Continuation of application No. PCT/CN2018/082011, filed on Apr. 4, 2018.

(30) Foreign Application Priority Data

Apr. 7, 2017 (WO) ................ PCT/CN2017/079784
Apr. 13, 2017 (WO) ................ PCT/CN2017/080334

(51) Int. Cl.
*H02J 50/10* (2016.01)
*H02J 50/80* (2016.01)
(Continued)

(52) U.S. Cl.
CPC ............... *H02J 50/10* (2016.02); *H02J 7/00* (2013.01); *H02J 7/0068* (2013.01); *H02J 7/025* (2013.01);
(Continued)

(58) Field of Classification Search
None
See application file for complete search history.

(56) References Cited

U.S. PATENT DOCUMENTS 6,208,115 B1 * 3/2001 Binder ................ H02J 7/02
320/108
9,425,644 B1 8/2016 Dellacona et al.
(Continued)

FOREIGN PATENT DOCUMENTS

CN 2464002 Y 12/2001
CN 1551444 A 12/2004
(Continued)

OTHER PUBLICATIONS

OA and English translation of issued in corresponding JP application No. 2019-514267 dated Aug. 7, 2020.
(Continued)

*Primary Examiner* — Thomas J. Hiltunen

(57) ABSTRACT

A device to-be-charged, a wireless charging apparatus and method are provided. The apparatus includes: a voltage converting circuit, configured to receive an input voltage and convert the input voltage to obtain an output voltage and an output current of the voltage converting circuit; a wireless transmitting circuit, configured to transmit an electromagnetic signal according to the output voltage and the output current of the voltage converting circuit to conduct wireless charging on a device to-be-charged; and a first control circuit, configured for wireless communication with the device to-be-charged during the wireless charging to acquire an output voltage and/or an output current of a step-down circuit fed back by the device to-be-charged, and adjust the output voltage and/or the output current of the voltage converting circuit according to the output voltage and/or the output current of the step-down circuit to adjust a transmission power of the electromagnetic signal.

17 Claims, 5 Drawing Sheets

(51) Int. Cl.

| | | |
|---|---|---|
| *H02J 7/00* | (2006.01) | |
| *H02J 7/02* | (2016.01) | |
| *H02J 7/04* | (2006.01) | |
| *H04B 5/00* | (2006.01) | |
| *H02J 50/12* | (2016.01) | |
| *H04B 1/04* | (2006.01) | |
| *H04B 1/16* | (2006.01) | |
| *H02J 50/70* | (2016.01) | |
| *H04W 4/80* | (2018.01) | |
| *H04B 10/11* | (2013.01) | |
| *H04W 84/12* | (2009.01) | |

(52) U.S. Cl.
CPC .............. *H02J 7/045* (2013.01); *H02J 50/12* (2016.02); *H02J 50/80* (2016.02); *H04B 1/04* (2013.01); *H04B 1/16* (2013.01); *H04B 5/0037* (2013.01); *H02J 7/0044* (2013.01); *H02J 50/70* (2016.02); *H04B 10/11* (2013.01); *H04W 4/80* (2018.02); *H04W 84/12* (2013.01)

(56) References Cited

U.S. PATENT DOCUMENTS

| | | | |
|---|---|---|---|
| 10,298,048 | B1 | 5/2019 | Juan et al. |
| 10,778,040 | B2* | 9/2020 | Nagaoka ................. H02M 7/48 |
| 2004/0080891 | A1 | 4/2004 | Shyr |
| 2007/0139012 | A1 | 6/2007 | Hayashigawa |
| 2008/0054855 | A1 | 3/2008 | Hussain et al. |
| 2011/0127954 | A1 | 6/2011 | Walley et al. |
| 2012/0001485 | A1 | 1/2012 | Uchida |
| 2012/0293007 | A1 | 11/2012 | Byun et al. |
| 2012/0300413 | A1 | 11/2012 | Iida |
| 2013/0002026 | A1 | 1/2013 | Mizutani et al. |
| 2013/0002202 | A1 | 1/2013 | Kuraishi |
| 2013/0033235 | A1 | 2/2013 | Fukaya |
| 2013/0285604 | A1 | 10/2013 | Partovi |
| 2013/0285620 | A1 | 10/2013 | Yamamoto et al. |
| 2014/0191568 | A1 | 7/2014 | Partovi |
| 2014/0247052 | A1 | 9/2014 | Hada |
| 2014/0329472 | A1 | 11/2014 | Kovacs et al. |
| 2014/0379047 | A1 | 12/2014 | Meskens |
| 2015/0015180 | A1 | 1/2015 | Miller et al. |
| 2015/0214748 | A1 | 7/2015 | Lin et al. |
| 2015/0236538 | A1 | 8/2015 | Cai et al. |
| 2015/0357851 | A1 | 12/2015 | Huang et al. |
| 2016/0006267 | A1 | 1/2016 | Muratov et al. |
| 2016/0020630 | A1 | 1/2016 | Tseng et al. |
| 2016/0036497 | A1 | 2/2016 | Tavakoli Shiraji et al. |
| 2016/0049825 | A1 | 2/2016 | Green et al. |
| 2016/0099601 | A1 | 4/2016 | Leabman et al. |
| 2016/0308401 | A1 | 10/2016 | Lee et al. |
| 2016/0320867 | A1 | 11/2016 | Chan et al. |
| 2016/0355095 | A1 | 12/2016 | Okamoto |
| 2016/0380467 | A1 | 12/2016 | Shao |
| 2017/0018951 | A1 | 1/2017 | Park |
| 2017/0033590 | A1 | 2/2017 | Lee et al. |
| 2017/0040810 | A1 | 2/2017 | Hu et al. |
| 2017/0054328 | A1 | 2/2017 | Jung et al. |
| 2017/0203656 | A1 | 7/2017 | Okamoto |
| 2018/0069409 | A1 | 3/2018 | Tian et al. |
| 2018/0097372 | A1 | 4/2018 | Li |
| 2018/0097383 | A1 | 4/2018 | Kato |
| 2018/0115179 | A1 | 4/2018 | Fan et al. |
| 2018/0241301 | A1 | 8/2018 | Nagaoka |

FOREIGN PATENT DOCUMENTS

| | | | |
|---|---|---|---|
| CN | 102013717 | A | 4/2011 |
| CN | 102522799 | A | 6/2012 |
| CN | 103001297 | A | 3/2013 |
| CN | 203036282 | A | 4/2013 |
| CN | 202998182 | U | 6/2013 |
| CN | 103269108 | A | 8/2013 |
| CN | 103280870 | A | 9/2013 |
| CN | 103944243 | A | 7/2014 |
| CN | 104113104 | A | 10/2014 |
| CN | 104283293 | A | 1/2015 |
| CN | 104467130 | A | 3/2015 |
| CN | 104600869 | A | 5/2015 |
| CN | 104617632 | A | 5/2015 |
| CN | 104752046 | A | 7/2015 |
| CN | 105098900 | A | 11/2015 |
| CN | 105148402 | A | 12/2015 |
| CN | 105226779 | A | 1/2016 |
| CN | 105337384 | A | 2/2016 |
| CN | 105471001 | A | 4/2016 |
| CN | 104283293 | B | 6/2016 |
| CN | 205355893 | U | 6/2016 |
| CN | 105826066 | A | 8/2016 |
| CN | 105896670 | A | 8/2016 |
| CN | 105978049 | A | 9/2016 |
| CN | 106026237 | A | 10/2016 |
| CN | 106169798 | A | 11/2016 |
| CN | 106300539 | A | 1/2017 |
| CN | 106451705 | A | 2/2017 |
| EP | 1763125 | A2 | 3/2007 |
| EP | 1821383 | A2 | 8/2007 |
| EP | 2328223 | A1 | 6/2011 |
| EP | 2590300 | A1 | 5/2013 |
| EP | 2824797 | A1 | 1/2015 |
| EP | 3068017 | A2 | 9/2016 |
| EP | 3113329 | A1 | 1/2017 |
| EP | 3131172 | A1 | 2/2017 |
| EP | 3133746 | A1 | 2/2017 |
| JP | 2000333377 | A | 11/2000 |
| JP | 2007288389 | A | 11/2007 |
| JP | 2008099370 | A | 4/2008 |
| JP | 2009504117 | A | 1/2009 |
| JP | 2011034306 | A | 2/2011 |
| JP | 2011120361 | A | 6/2011 |
| JP | 2011139622 | A | 7/2011 |
| JP | 2012085372 | A | 4/2012 |
| JP | 2013115859 | A | 6/2013 |
| JP | 2013223301 | A | 10/2013 |
| JP | 2013243890 | A | 12/2013 |
| JP | 2014171289 | A | 9/2014 |
| JP | 2016015862 | A | 1/2016 |
| JP | 2016063725 | A | 4/2016 |
| JP | 2016063726 | A | 4/2016 |
| JP | 2016123162 | A | 7/2016 |
| JP | 2016152722 | A | 8/2016 |
| JP | 2016214025 | A | 12/2016 |
| JP | 2017046521 | A | 3/2017 |
| JP | 2017060328 | A | 3/2017 |
| KR | 100792311 | B1 | 1/2008 |
| KR | 20120092038 | A | 8/2012 |
| KR | 20130007985 | A | 1/2013 |
| KR | 101270675 | B1 | 6/2013 |
| KR | 20130124698 | A | 11/2013 |
| KR | 101580342 | B1 | 12/2015 |
| KR | 20160053994 | A | 5/2016 |
| KR | 20160110023 | A | 9/2016 |
| KR | 101676591 | B1 | 11/2016 |
| TW | 201145753 | A | 12/2011 |
| TW | I482391 | B | 4/2015 |
| TW | 201533561 | A | 9/2015 |
| TW | I552483 | B | 10/2016 |
| WO | 2014080671 | A1 | 5/2014 |
| WO | 2014115193 | A1 | 7/2014 |
| WO | 2016074458 | A1 | 5/2016 |
| WO | 2016181656 | A1 | 11/2016 |

OTHER PUBLICATIONS

Communication pursuant to Article 94(3) EPC issued in corresponding European application No. 17904556.2 dated Sep. 14, 2020.

OA and English translation of issued in corresponding JP application No. 2019-539764 dated Sep. 1, 2020.

Notice of Final Rejection and English translation of issued in corresponding KR application No. 10-2019-7007549 dated Aug. 7, 2020.

(56) References Cited

OTHER PUBLICATIONS

OA and English translation of issued in corresponding KR application No. 10-2019-7007549 dated Sep. 4, 2020.
OA and English translation of issued in corresponding KR application No. 10-2019-7026966 dated Aug. 18, 2020.
Examination report issued in corresponding IN application No. 201917009580 dated Jul. 21, 2020.
Li J et al:"The effects of pulse charging on cycling characteristics of commercial lithium-ion batteries", Journal of Power Sources, Elsevier SA, CH, vol. 102, No. 1-2, Dec. 1, 2001(Dec. 1, 2001), pp. 302-309, XP004331050, ISSN:0378-7753, DOI:10.1016/S0378-7753(01)00820-5.
Communication pursuant to Article 94(3) EPC issued in corresponding European application No. 18781213.6 dated Jul. 24, 2020.
Extended European search report issued in corresponding European application No. 17904556.2 dated Apr. 5, 2019.
English translation of the Notice of Reasons for Refusal issued in corresponding JP application No. 2019-514267 dated May 29, 2020.
Communication pursuant to Article 94(3) EPC issued in corresponding European application No. 17904556.2 dated May 4, 2020.
English translation of the Reason for Refusal issued in corresponding KR application No. 2019-7007549 dated Mar. 26, 2020.
Communication pursuant to Article 94(3) EPC issued in corresponding European application No. 17904556.2 dated Dec. 4, 2019.
The extended European search report issued in corresponding European application No. 17904431.8 dated Sep. 26, 2019.
Communication pursuant to Article 94(3) EPC issued in corresponding European application No. 17904431.8 dated Jun. 16, 2020.
International search report issued in corresponding international application No. PCT/CN2017/085990 dated Jan. 15, 2018.
First Examination Report issued in corresponding IN application No. 201917008151 dated Jun. 12, 2020.
English translation of the Notification Letter of Review Opinions issued in corresponding TW application No. 107112166 dated Jan. 4, 2019.
Communication pursuant to Article 94(3) EPC issued in corresponding European application No. 17905763.3 dated Jun. 4, 2020.
English translation of the first office action issued in corresponding CN application No. CN201780041786.3 dated May 6, 2020.
English translation of the second office action issued in corresponding CN application No. CN201780041786.3 dated Jul. 10, 2020.
Communication pursuant to Article 94(3) EPC issued in corresponding European application No. 17905763.3 dated Jan. 15, 2020.
First Examination Report issued in corresponding IN application No. 201917000972 dated Mar. 2, 2020.
Extended European search report issued in corresponding European application No. 17905763.3 dated Jul. 15, 2019.
English translation of the TW office action issued in corresponding TW application No. 107112719 dated Jan. 10, 2019.
First Examination Report issued in corresponding IN application No. 201917036311 dated Jul. 6, 2020.
International search report issued in corresponding international application No. PCT/CN2018/081963 dated Jul. 11, 2018.
International search report issued in corresponding international application No. PCT/CN2018/081962 dated Jun. 29, 2018.
Extended European search report issued in corresponding European application No. 18781213.6 dated Feb. 21, 2020.
International search report issued in corresponding international application No. PCT/CN20171079784 dated Dec. 4, 2017.
International search report issued in corresponding international application No. PCT/CN2018/082011 dated Jul. 17, 2018.
International search report issued in corresponding international application No. PCT/CN2017/080334 dated Jan. 18, 2018.
OA3 with English Translation issued in corresponding CN application No. 201780041786.3 dated Oct. 29, 2020.
Examination report issued in corresponding European application No. 18781213.6 dated Nov. 19, 2020.
OA with English Translation issued in corresponding JP application No. 2019552162 dated Nov. 6, 2020.
Examination report issued in corresponding European application No. 17904431.8 dated Dec. 15, 2020.
Non-final OA issued in corresponding U.S. Appl. No. 16/528,063 dated Dec. 30, 2020.
Decision for rejection with English Translation issued in corresponding CN application No. 2017800417863 dated Jan. 26, 2021.
Charging protocols for lithium-ion batteries and their impact on cycle life, XP 55765066.
OA issued with English Translation in corresponding KR application No. 10-2019-7027259 dated Jan. 27, 2021.
Non-final OA issued in corresponding U.S. Appl. No. 16/238,162 dated Feb. 1, 2021.
Non-final OA issued in corresponding U.S. Appl. No. 16/271,131 dated Jan. 25, 2021.
Communication pursuant to Article 94(3) EPC issued in corresponding European application No. 17904556.2 dated Jan. 19, 2021.
Notice of Allowance with English Translation issued in corresponding KR application No. 10-2019-7026966 dated Feb. 32, 2021.
Decision of reasons for refusal issued in corresponding JP application No. 2019539764 dated Apr. 2, 2021.
Examination report issued in corresponding European application No. 18781213.6 dated Mar. 2, 2021.
Final Rejection with English Translation issued in corresponding KR application No. 20197007549 dated Mar. 19, 2021.
Korean Office Action with English Translation for KR Application 2019-7031258 dated Apr. 23, 2021. (13 pages).
Japanese Decision of Refusal with English Translation for JP Application 2019545913 dated Apr. 27, 2021. (7 pages).
Examination report issued in corresponding European application No. 17904431.8 dated Jun. 10, 2021.

* cited by examiner

DEVICE TO-BE-CHARGED, WIRELESS CHARGING APPARATUS, AND WIRELESS CHARGING METHOD

CROSS-REFERENCE TO RELATED APPLICATION(S)

This application is a continuation of International Patent Application No. PCT/CN2018/082011, filed on Apr. 4, 2018, which claims priority to International Patent Application No. PCT/CN2017/079784, filed on Apr. 7, 2017 and International Patent Application No. PCT/CN2017/080334, filed on Apr. 13, 2017, the disclosures of all of which are hereby incorporated by reference in their entireties.

TECHNICAL FIELD

This disclosure relates to the field of charging and more particularly, to a device to-be-charged, a wireless charging apparatus, and a wireless charging method.

BACKGROUND

With popularity of wireless charging, an increasing number of electronic devices support a wireless charging function. The manner of wireless electrical power/energy transfer in wireless charging technology includes electromagnetic induction, electromagnetic resonance, and electromagnetic radiation. Taking wireless charging technology based on electromagnetic induction as an example, the principle of wireless electrical power transfer based on electromagnetic induction lies in that, energy transfer is conducted through coil coupling and a transmitting end and a receiving end are respectively provided with a coil. The transmitting end is coupled with a high frequency alternating signal to generate an electromagnetic signal. The receiving end converts through a coil the electromagnetic signal received into a current. The current is used for providing electrical power to a device after being subjected to processing of a rectifier circuit, a voltage stabilizing circuit, etc.

In the case of wireless charging technology, an interface of a device to-be-charged which is configured to be coupled with a charging cable can be removed, and it is unnecessary to be coupled with a cable for charging, which makes charging more convenient.

However, wireless charging technology in the related art has at least a disadvantage of serious heating in wireless charging.

SUMMARY

In a first aspect of the present disclosure, a wireless charging apparatus is provided. The wireless charging apparatus includes a voltage converting circuit, a wireless transmitting circuit, and a first control circuit. The voltage converting circuit is configured to receive an input voltage and convert the input voltage to obtain an output voltage and an output current of the voltage converting circuit. The wireless transmitting circuit is configured to transmit an electromagnetic signal according to the output voltage and the output current of the voltage converting circuit to conduct wireless charging on a device to-be-charged. The first control circuit is configured for wireless communication with the device to-be-charged during the wireless charging to acquire at least one of an output voltage and an output current of a step-down circuit fed back by the device to-be-charged, and adjust at least one of the output voltage and the output current of the voltage converting circuit according to at least one of the output voltage and the output current of the step-down circuit to adjust a transmission power of the electromagnetic signal, to make a voltage difference between an input voltage of the step-down circuit and the output voltage of the step-down circuit meet a preset condition.

In a second aspect of the present disclosure, a device to-be-charged is provided. The device to-be-charged includes a battery, a wireless receiving circuit, a step-down circuit, a detecting circuit, and a second control circuit. The wireless receiving circuit is configured to receive an electromagnetic signal from a wireless charging apparatus and convert the electromagnetic signal into an output voltage and an output current of the wireless receiving circuit. The step-down circuit is configured to receive the output voltage of the wireless receiving circuit and decrease the output voltage of the wireless receiving circuit to charge the battery. The detecting circuit is configured to detect at least one of an output voltage and an output current of the step-down circuit. The second control circuit is configured to communicate with the wireless charging apparatus according to at least one of the output voltage and the output current of the step-down circuit detected by the detecting circuit, whereby the wireless charging apparatus adjusts a transmission power of the electromagnetic signal to make a voltage difference between an input voltage of the step-down circuit and the output voltage of the step-down circuit meet a preset condition.

In a third aspect of the present disclosure, a wireless charging method is provided. The wireless charging method is applicable to a device to-be-charged and includes the following. A wireless receiving circuit receives an electromagnetic signal from a wireless charging apparatus and converts the electromagnetic signal into an output voltage and an output current of the wireless receiving circuit. A step-down circuit receives the output voltage of the wireless receiving circuit and decreases the output voltage of the wireless receiving circuit to charge a battery of the device to-be-charged. At least one of an output voltage and an output current of the step-down circuit is detected. Communicate with the wireless charging apparatus according to at least one of the output voltage and the output current of the step-down circuit detected, whereby the wireless charging apparatus adjusts a transmission power of the electromagnetic signal.

BRIEF DESCRIPTION OF THE DRAWINGS

The accompanying drawings are provided for better understanding of the present disclosure and form a part of the specification. In connection with implementations of the disclosure below, the accompanying drawings are used for explaining rather than limiting the disclosure.

DETAILED DESCRIPTION

Hereinafter, implementations of the disclosure will be described in detail with reference to the accompanying drawings. It is to be understood that, the implementations described below are merely for illustrating and explaining, rather than limiting, the disclosure.

The term "circuit" used in this disclosure refers to all of the following: (a) hardware-only circuit implementations (such as only in analog and/or digital circuits); (b) a combination of circuits and software (and/or firmware), such as (if applicable): (i) a combination of processor(s) or (ii) a portion of processor(s)/software (including digital signal processor(s)), software, and memory(s) that work together to cause a device such as a mobile phone or server to perform various functions; (c) a circuit of microprocessor(s) or a portion of microprocessor(s) that requires software or firmware for operation, even if the software or firmware does not physically exist. This definition of "circuit" is applicable to all uses of this term in this disclosure including any of the claims.

In implementations of the present disclosure, the device to-be-charged can be a terminal. The "terminal" can include but is not limited to a device coupled via a wired line and/or a wireless interface to receive/transmit communication signals. Examples of the wired line may include, but are not limited to, at least one of a public switched telephone network (PSTN), a digital subscriber line (DSL), a digital cable, a direct connection cable, and/or other data connection lines or network connection lines. Examples of the wireless interface may include, but are not limited to, a wireless interface with a cellular network, a wireless local area network (WLAN), a digital television network (such as a digital video broadcasting-handheld (DVB-H) network), a satellite network, an amplitude modulation-frequency modulation (AM-FM) broadcast transmitter, and/or with other communication terminals. A communication terminal configured to communicate via a wireless interface may be called a "wireless communication terminal", a "wireless terminal", and/or a "mobile terminal". Examples of a mobile terminal may include, but are not limited to, a satellite or cellular telephone, a personal communication system (PCS) terminal capable of cellular radio telephone, data processing, fax, and/or data communication, a personal digital assistant (PDA) equipped with radio telephone, pager, Internet/Intranet access, web browsing, notebook, calendar, and/or global positioning system (GPS) receiver, and a conventional laptop or a handheld receiver or other electronic devices equipped with radio telephone transceiver. In addition, in implementations of the present disclosure, the device to-be-charged or terminal can also include a power bank. The power bank can be charged by a wireless charging apparatus and thus store energy to charge other electronic devices.

Figure 1:
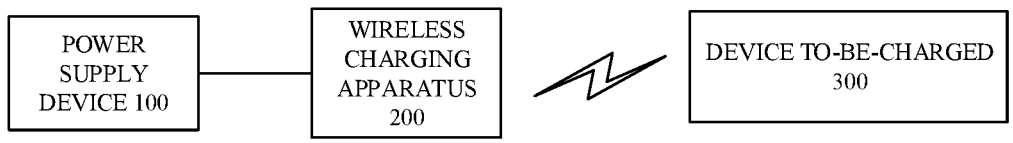
FIG. 1 is a schematic diagram of a wireless charging system according to an implementation of the present disclosure.

FIG. 1 is a schematic diagram of a wireless charging system according to an implementation of the present disclosure.

The wireless charging system 10 includes a power supply device 100, a wireless charging apparatus 200, and a device to-be-charged 300.

In an implementation, the power supply device 100 is configured to provide direct current (DC) to the wireless charging apparatus 200. The power supply device 100 includes a rectifier circuit, a transformer circuit, a control circuit, and a charging interface, such that an alternating current (AC) input can be converted into a DC output to be provided to the wireless charging apparatus 200. For example, the power supply device can be an adaptor, a power bank, a vehicle power supply, or the like.

In another implementation, the power supply device 100 provides directly an AC to the wireless charging apparatus 200. For example, the power supply device 100 can be an AC power supply. When the power supply device 100 is an AC power supply, the wireless charging apparatus 200 further includes a circuit or module for converting the AC into a DC, such as a rectifier-filter circuit, a DC/DC converter, and the like.

The wireless charging apparatus 200 is configured to convert the DC or AC provided by the power supply device 100 into an electromagnetic signal for power delivery in a wireless manner.

Figure 2:
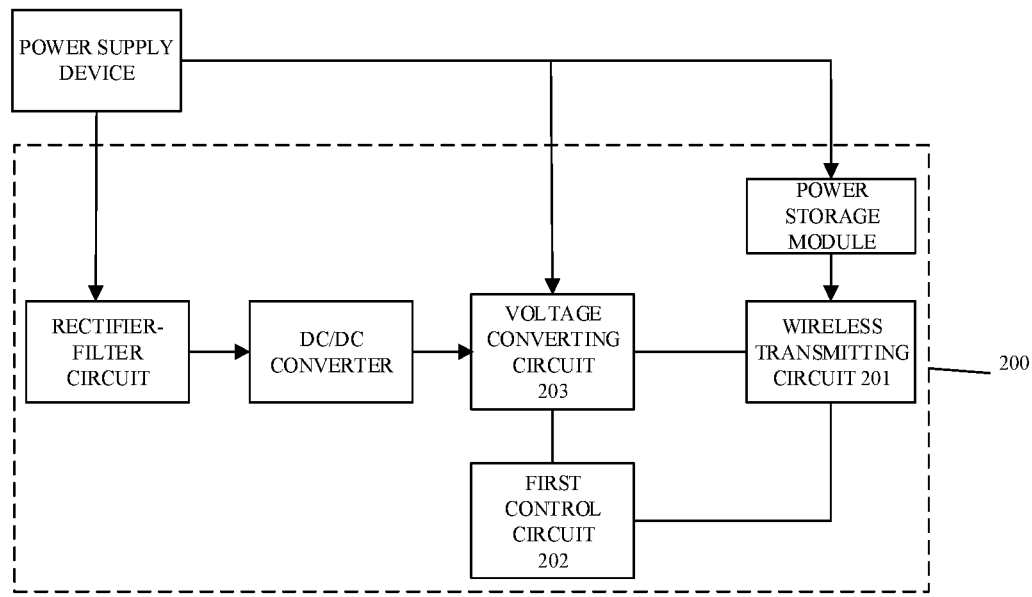
FIG. 2 is a structural block diagram of a wireless charging apparatus according to an implementation of the present disclosure.

As illustrated in FIG. 2, in an implementation, the wireless charging apparatus 200 includes a rectifier-filter circuit (not illustrated), a DC/DC converter (not illustrated), a wireless transmitting circuit 201, and a first control circuit 202.

A 220V (volt) AC is converted into a steady DC with the rectifier-filter circuit, and the DC is then subjected to conversion of the DC/DC converter to be adjusted to a voltage having a fixed magnitude to be provided to the wireless transmitting circuit 201.

It is to be understood that, the rectifier-filter circuit and the DC/DC converter are optional. As mentioned above, when the power supply device 100 is an AC power supply, the wireless charging apparatus 200 can be provided with the rectifier-filter circuit and the DC/DC converter. When the power supply device 100 can provide a steady DC, the rectifier-filter circuit and/or the DC/DC converter can be removed.

The wireless transmitting circuit 201 is configured to convert a DC provided by the DC/DC converter or the power supply device into an AC that can be coupled to a transmitting coil, and the AC is then converted through the transmitting coil into an electromagnetic signal for transmission.

In an implementation, the wireless transmitting circuit 201 includes an inverter circuit and a resonant circuit. The inverter circuit includes multiple switch transistors. An output power can be adjusted by controlling turn-on time (duty cycle) of the switch transistor. The resonant circuit is configured to transfer electrical power out. For instance, the resonant circuit includes a capacitor and a transmitting coil. By adjusting a resonant frequency of a switch transistor of the resonant circuit, an output power of the wireless transmitting circuit 201 can be adjusted.

In an example, the wireless charging apparatus 200 can be a wireless charging base or a device with an power storage function. When the wireless charging apparatus 200 is a device with an power storage function, the wireless charging apparatus 200 further includes an power storage module (such as a lithium battery 305), which can obtain electrical power/energy from an external power supply device for storage, such that the power storage module can provide the electrical power to the wireless transmitting circuit 201. It should be understood that, the wireless charging apparatus 200 can obtain electrical power from the external power supply device in a wired or wireless manner. In terms of the wired manner, for example, the wireless charging apparatus 200 is coupled with the external power supply device via a charging interface (such as a Type-C interface) to obtain electrical power. In terms of the wireless manner, for example, the wireless charging apparatus 200 includes a wireless receiving circuit similar to that illustrated in FIG. 3, which can obtain electrical power wirelessly from a device with a wireless charging function.

The first control circuit 202 is configured to control wireless charging. For instance, the first control circuit 202 may communicate with the power supply device to determine an output voltage and/or an output current of the power supply device, or may communicate with a device to-be-charged to exchange charging information (such as a voltage of a battery 305 of the device to-be-charged, a temperature of the battery 305, a charging mode, or the like) and to determine charging parameters (such as a charging voltage and/or a charging current) for wireless charging.

It should be understood that, the wireless charging apparatus 200 can further include other related hardware, logic components, circuits, and/or codes for achieving respective functions. For example, the wireless charging apparatus 200 further includes a display module (such as a light emitting diode (LED) or an LED display screen), which is configured to display in real time a charging state (for example, in charging, or charging completed) during wireless charging.

As illustrated in FIG. 2, in an implementation, the wireless charging apparatus 200 further includes a voltage converting circuit 203. The voltage converting circuit 203 is configured to conduct voltage conversion on a voltage provided to the wireless transmitting circuit 201 when the voltage provided to the wireless transmitting circuit 201 does not satisfy a preset condition. For example, the voltage conversion can be increasing voltage or decreasing voltage and accordingly, the voltage converting circuit 204 can be implemented as a step-up circuit or step-down circuit. As mentioned above, in an example, the current provided to the wireless transmitting circuit 201 may be provided by the DC/DC converter, the power supply device, or the power storage module described above.

Alternatively, when the voltage provided to the wireless transmitting circuit 201 can meet requirements on input voltage of the wireless transmitting circuit 201, the voltage converting circuit 203 can be omitted, to simplify the implementation of the wireless charging apparatus. Requirements on input voltage of the wireless transmitting circuit 201 can be set according to actual needs, for example, the input voltage required can be set to 10V.

In an example, the expression "the voltage of the current provided to the wireless transmitting circuit 201 does not satisfy the preset condition" can be comprehended as follows. Such a voltage is lower or higher than a voltage required by the wireless transmitting circuit 201. For instance, the wireless charging is conducted in a charging mode of high-voltage and small-current (such as 20V/1 A), and such a mode has high requirements on input voltage (such as 10V or 20V) of the wireless transmitting circuit 201. If the voltage provided to the wireless transmitting circuit 201 is unable to reach the input voltage required by the wireless transmitting circuit 201, the voltage converting circuit 203 will increase the input voltage to meet requirements on input voltage of the wireless transmitting circuit 201. If an output voltage of the power supply device is higher than the input voltage required by the wireless transmitting circuit 201, the voltage converting circuit 203 will decrease the input voltage to meet requirements on input voltage of the wireless transmitting circuit 201.

Figure 3:
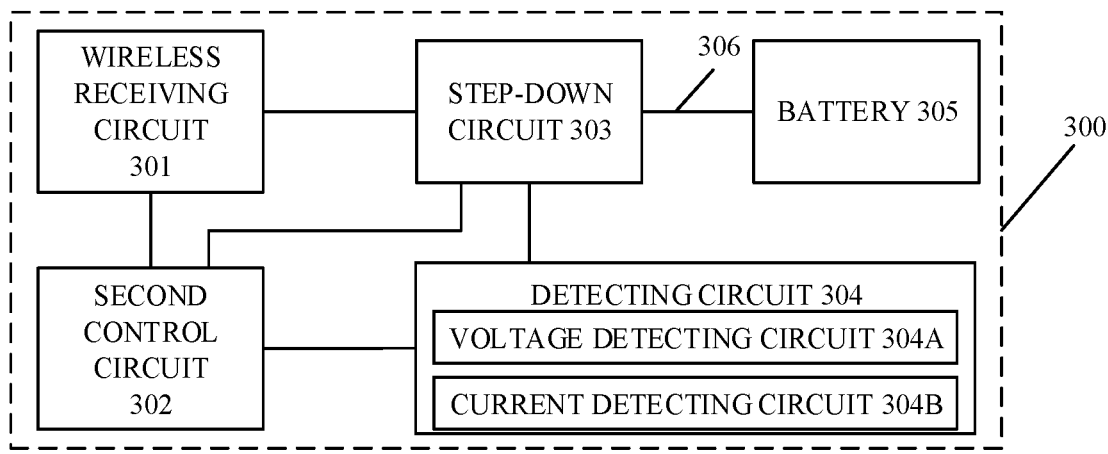
FIG. 3 is a structural block diagram of a device to-be-charged according to an implementation of the present disclosure.

In an implementation, as illustrated in FIG. 3, a device to-be-charged 300 includes a wireless receiving circuit 301, a second control circuit 302, a step-down circuit 303, a detecting circuit 304, a battery 305, and a first charging channel 306.

In an example, the wireless receiving circuit 301 is configured to convert, through a receiving coil, an electromagnetic signal transmitted by the wireless transmitting circuit 201 of the wireless charging apparatus 200 into an AC and conduct rectification and/or filtering on the AC to convert the AC into a steady DC, to charge the battery 305.

In an example, the wireless receiving circuit 301 includes a receiving coil and an AC/DC converter 307. The AC/DC converter 307 is configured to convert an AC received by the receiving coil into a DC.

In an example, the battery 305 may include one single cell or multiple cells. When the battery 305 includes multiple cells, the multiple cells are coupled in series. As such, a charging voltage that the battery 305 can accept is a sum of charging voltages that the multiple cells can accept respectively, which is possible to increase the charging speed and reduce heating during charging.

For example, the device to-be-charged is a mobile phone. When the battery 305 of the device to-be-charged includes one single cell, a voltage of the single cell is generally 3.0V to 4.35V. However, when the battery 305 of the device to-be-charged includes two cells coupled in series, a total voltage of the two cells coupled in series is 6.0V to 8.7V. Therefore, compared with one single cell, when the battery 305 includes multiple cells coupled in series, an output voltage of the wireless receiving circuit 301 can be increased. To reach an equal charging speed, a charging current required by multiple cells is approximately 1/N times a charging current required by one single cell, where N is the number of cells coupled in series in the device to-be-charged. In other words, under a condition of an equal charging speed (that is, an equal charging power), by adopting multiple cells, it is possible to decrease the charging current, thereby reducing heating of the device to-be-charged during charging. On the other hand, compared with one single cell, under a condition of an equal charging current, by adopting multiple cells, a charging voltage can be increased, thereby increasing the charging speed.

In an example, the first charging channel 306 can be a wire. The first charging channel 306 can be provided with the step-down circuit 303.

The step-down circuit 303 is configured to decrease a voltage of a DC outputted by the wireless receiving circuit 301 to obtain an output voltage and an output current of the first charging channel 306. In an example, a voltage value and a current value of a DC outputted by the first charging channel 306 meet charging requirements of the battery 305, and thus the DC outputted by the first charging channel 306 can be directly applied to the battery 305.

The detecting circuit 304 is configured to detect a voltage value and/or a current value of the first charging channel 306. The voltage value and/or the current value of the first charging channel 306 may be a voltage value and/or a current value between the wireless receiving circuit 301 and the step-down circuit 303, that is, an output voltage value and/or an output current value of the wireless receiving circuit 301. Alternatively, the voltage value and/or the current value of the first charging channel 306 may be a voltage value and/or a current value between the step-down circuit 303 and the battery 305, that is, an output voltage and/or an output current of the step-down circuit 303.

In an example, the detecting circuit 304 includes a voltage detecting circuit 304A and a current detecting circuit 304B. The voltage detecting circuit 304A is configured to sample a voltage in the first charging channel 306 and transmit sampled voltage value to the second control circuit 302. In some examples, the voltage detecting circuit 304A is configured to sample the voltage in the first charging channel 306 by voltage division in series. The current detecting circuit 304B is configured to sample a current in the first charging channel 306 and transmit sampled current value to the second control circuit 302. In some examples, the current detecting circuit 304B is configured to sample and/or detect the current in the first charging channel 306 via a current sensing resistor and a current detector.

In an example, the second control circuit 302 is configured to communicate with the first control circuit 202 of the wireless charging apparatus and feed back a voltage value and/or a current value detected by the detecting circuit 304 to the first control circuit 202. As such, the first control circuit 202 can adjust the transmission power of the wireless transmitting circuit 201 according to the voltage value and/or the current value fed back, to make the voltage value and/or the current value of the DC outputted by the first charging channel 306 match a charging voltage value and/or a charging current value required by the battery 305.

It is to be understood that, in an example, the expression "match the charging voltage value and/or the charging current value required by the battery 305" can be comprehended as follows. The voltage value and/or the current value of the DC outputted by the first charging channel 306 is equal to the charging voltage value and/or the charging current value required by the battery 305, or a difference between the voltage value and/or the current value of the DC outputted by the first charging channel 306 and the charging voltage value and/or the charging current value required by the battery 305 is within a preset range (for example, the voltage value is 100 mV~200 mV higher or lower than the charging voltage value required).

In implementations of the disclosure, the step-down circuit 303 can be implemented in various forms. In an implementation, the step-down circuit 303 is a Buck circuit. In another implementation, the step-down circuit 303 is a charge pump. The charge pump is composed of multiple switch components. Heat produced when current flows through the multiple switch components is small, almost the same as heat produced when current flows directly through a wire. Therefore, by adopting the charge pump as the step-down circuit 303, not only can voltage be decreased, but also heating is low. In an example, the step-down circuit 303 can also be a half voltage circuit.

In an example, a step-up factor of the voltage converting circuit 203 of the wireless charging apparatus 200 and a step-down factor of the step down circuit 303 of the device to-be-charged 300 depend on an output voltage that the power supply device is able to provide, a charging voltage required by the battery 305, or the like. The step-up factor of the voltage converting circuit 203 may or may not be equal to the step-down factor of the step down circuit 303, which is not particularly limited herein.

As an example, the step-up factor of the voltage converting circuit 203 is equal to the step-down factor of the step-down circuit 303. For example, the voltage converting circuit 203 is a voltage multiplier circuit (also known as a voltage doubler circuit or doubler circuit) configured to double the output voltage of the power supply device. The step-down circuit 303 is a half voltage circuit configured to decrease the output voltage of the wireless receiving circuit 301 by half.

In this example, the step-up factor of the voltage converting circuit 203 is set to be equal to the step-down factor of the step-down circuit 303. As such, the output voltage and the output current of the step-down circuit 303 are equal to the output voltage and the output current of the power supply device respectively, which is beneficial to simplifying the structure of control circuits 202 and 302. As an example, a charging current required by the battery 305 is 5 A. When the second control circuit 302 knows through the detecting circuit 304 that the output current of the step-down circuit 303 is 4.5 A, it is necessary to adjust an output power of the power supply device to make the output current of the step-down circuit 303 reach 5 A. If the step-up factor of the voltage converting circuit 203 is not equal to the step-down factor of the step-down circuit 303, when the output power of the power supply device is adjusted, it is necessary for the first control circuit 202 or the second control circuit 302 to re-calculate an adjustment range of the output power of the power supply device according to a difference between a present output current of the step-down circuit 303 and an expected output current. In this example, the step-up factor of the voltage converting circuit 203 is set to be equal to the step-down factor of the step-down circuit 303, in this way, the second control circuit 302 can simply instruct the first control circuit 202 to increasing the output current of the power supply device to 5 A, thereby simplifying feedback adjustment of a wireless charging path.

Figure 4:
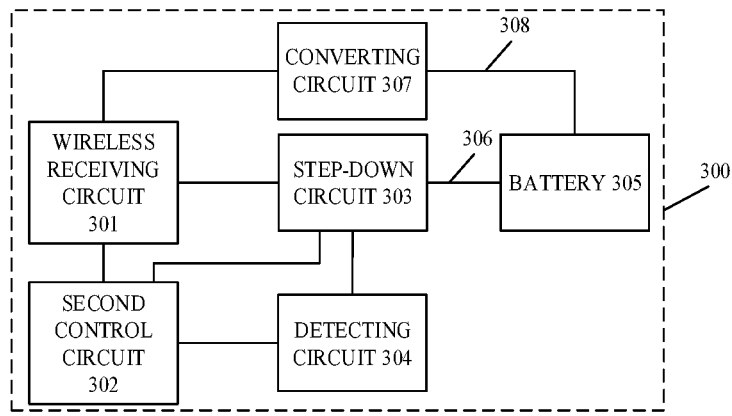
FIG. 4 is a structural block diagram of a device to-be-charged according to another implementation of the present disclosure.

As illustrated in FIG. 4, in an example, the device to-be-charged 300 further includes a second charging channel 308. The second charging channel 308 can be a wire. The second charging channel 308 can be provided with a converting circuit 307 configured to conduct voltage control on the DC outputted by the wireless receiving circuit 301 to obtain an output voltage and an output current of the second charging channel 308 to charge the battery 305.

In an example, the converting circuit 307 includes a circuit for voltage stabilization (such as a voltage stabilizing circuit) and a circuit for achieving constant current and constant voltage. The voltage stabilizing circuit is coupled with the wireless receiving circuit 301. The circuit for achieving constant current and constant voltage is coupled with the battery 305.

When the battery 305 is charged through the second charging channel 308, the transmission power of the wireless transmitting circuit 201 can be constant. After the wireless receiving circuit 301 receives the electromagnetic signal, the converting circuit 307 converts the electromagnetic signal into a voltage and a current that meet charging requirements of the battery 305 and then inputs the converted voltage and the converted current into the battery 305 for charging. It should be understood that, in some implementations, a constant transmission power does not necessarily refer to a transmission power that remains completely constant. Instead, the constant transmission power may vary within a certain range, for example, the transmission power is 7.5 W (watt) and can fluctuate by 0.5 W.

In this example, the second control circuit 302 is further configured to determine an error value by comparing the output voltage value of the second charging channel 308 detected with a preset target value (such as a voltage value required by the battery 305) and then transmit the error value to a first controller in the form of data package. The output voltage value of the second charging channel 308 may be a voltage value between the converting circuit 307 and the battery 305.

In an example, when the battery 305 is charged through the second charging channel 308, wireless charging between the wireless charging apparatus and the device to-be-charged can be conducted under QI standard. In this way, a data signal including the above error value can be coupled, through signal modulation, to a coil of the wireless receiving circuit 301 to be transmitted to a coil of the wireless transmitting circuit 201 and then to the first controller.

In another example, when the battery 305 is charged through the second charging channel 308, wireless transfer of electrical power can be controlled as follows.

The second control circuit 302 determines an error value by comparing the output voltage value of the second charging channel 308 detected with a preset target value and then transmits the error value to a first controller in the form of data package. The first controller determines a difference according to a present current value of a transmitting coil and information of the data package including the error value and determines, according to the difference, a new working frequency to adjust the transmission power of the wireless transmitting circuit 201.

In implementations of the disclosure, a charging mode in which the battery 305 is charged through the first charging channel 306 is referred to as a first charging mode, and a charging mode in which the battery 305 is charged through the second charging channel 308 is referred to as a second charging mode. The wireless charging apparatus can communicate with the device to-be-charged to determine to enable the first charging mode or the second charging mode to charge the battery 305.

In implementations of the disclosure, at the wireless charging apparatus, when the device to-be-charged is charged in the first charging mode, a maximum transmission power of the wireless transmitting circuit 201 can be a first transmission power (value). When the device to-be-charged is charged in the second charging mode, the maximum transmission power of the wireless transmitting circuit 201 can be a second transmission power (value). The first transmission power (value) is higher than the second transmission power (value), such that a speed at which the device to-be-charged is charged in the first charging mode is higher than that in the second charging mode.

As described above, in an example, to reduce heating of a coil during wireless charging, in the first charging mode, the wireless transmitting circuit 201 can adopt a high voltage and a small current, that is, an output voltage of the wireless transmitting circuit 201 in the first charging mode is higher than that in the second charging mode, such that the first transmission power (value) is higher than the second transmission power (value).

At the device to-be-charged, the second control circuit 302 controls switching between the first charging channel 306 and the second charging channel 308 according to the charging mode. When the first charging mode is enabled, the second control circuit 302 controls the step-down circuit 303 in the first charging channel 306 to work. When the second charging mode is enabled, the second control circuit 302 controls the converting circuit 307 in the second charging channel 308 to work.

In implementations of the disclosure, the wireless charging apparatus does not charge the device to-be-charged indiscriminately in the first charging mode or in the second charging mode. Instead, the wireless charging apparatus conducts a two-way communication with the device to-be-charged to negotiate for use of the charging mode, which makes a charging process safer.

Figure 5:
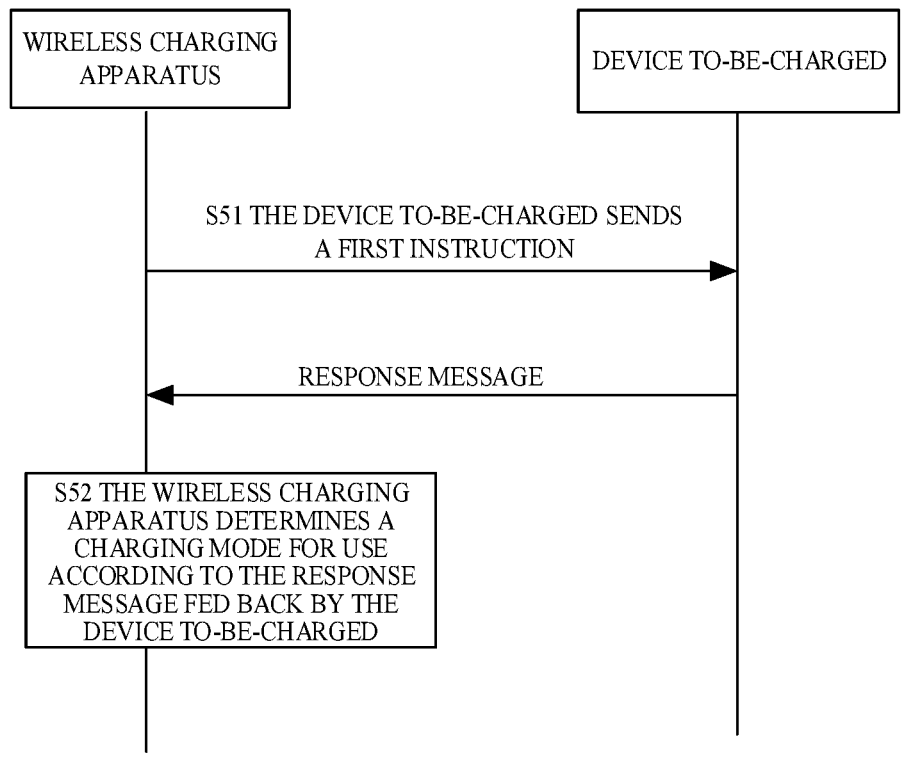
FIG. 5 is a schematic flowchart of communication between a wireless charging apparatus and a device to-be-charged according to an implementation of the present disclosure.

FIG. 5 is a schematic flowchart of communication between a wireless charging apparatus and a device to-be-charged according to an implementation of the present disclosure.

At S51, a wireless charging apparatus sends a first instruction to a device to-be-charged.

The first instruction is used for enquiring whether the device to-be-charged is operable in a first charging mode or requesting at least one of the following information of the device to-be-charged: a type or a model of the device to-be-charged (for example, a model set before leaving the factory), an identification code of the device to-be-charged (such as a character string preset for the device to-be-charged indicative of whether the device to-be-charged is operable in or supports the first charging mode), a maximum charging voltage and a maximum charging current supported by the device to-be-charged, etc. As described above, the maximum charging voltage and the maximum charging current supported by the device to-be-charged relate to circuit parameters of the step-down circuit 303 or the converting circuit 307 of the device to-be-charged and/or the number of cells in the battery 305 of the device to-be-charged.

At S52, the wireless charging apparatus determines a charging mode for use according to a response message fed back by the device to-be-charged.

In an example, when the response message indicates that the device to-be-charged is operable in the first charging mode, the wireless charging apparatus determines to enable the first charging mode. On the contrary, when the response message indicates that the device to-be-charged is not operable in the first charging mode, the wireless charging apparatus determines to enable a second charging mode.

The response message fed back by the device to-be-charged includes at least one of: the type or model of the device to-be-charged, the identification code of the device to-be-charged, the maximum charging voltage and the maximum charging current supported by the device to-be-charged, etc. The wireless charging apparatus determines the charging mode for use according to the response message received. For example, when the type or model of the device to-be-charged indicates that the device to-be-charged is operable in the first charging mode, the wireless charging apparatus determines to use the first charging mode to conduct wireless charging on the device to-be-charged.

In an example, the wireless charging apparatus feeds back the charging mode determined to the device to-be-charged, such that the device to-be-charged can control on-off states of the first charging channel 306 or the second charging channel 308.

In an implementation, communication between the wireless charging apparatus and the device to-be-charged can be Bluetooth communication, wireless fidelity (Wi-Fi) communication, near field communication (NFC) based on a high carrier frequency, optical communication, ultrasonic communication, ultra-wideband communication, or mobile communication.

In an example, an NFC module based on a high carrier frequency includes an integrated circuit (IC) chip with an extremely high frequency (EHF) antenna encapsulated. As an example, the high carrier frequency is 60 GHz.

In an example, an optical communication module includes an infrared communication module. The infrared communication module can transmit information with an infrared ray.

In an example, a mobile communication module can transmit information based on the fifth-generation (5G) communication protocol, the 4G communication protocol, the 3G communication protocol, and other mobile communication protocols.

Compared with the forgoing communication manner in which the data signal is coupled to the coil of the wireless receiving circuit 301 through signal modulation, by adopting the above wireless communication manner, communication can be more reliable. In addition, voltage ripples caused by communication in a signal coupling manner can be avoided, and such voltage ripples can affect voltage processing of the converter circuit 307 or the step-down circuit 303.

In implementations of the disclosure, besides communicating with the device to-be-charged to determine a charging mode between the wireless charging apparatus and the device to-be-charged, the wireless charging apparatus can also communicate with a power supply device to determine a charging mode between the power supply device and the wireless charging apparatus.

As mentioned above, a transmission power of the wireless charging apparatus in the first charging mode is higher than that in the second charging mode, that is, a voltage required by the wireless transmitting circuit 201 of the wireless charging apparatus in the first charging mode is higher. Therefore, the wireless charging apparatus can communicate with the power supply device to make the power supply device provide a suitable voltage.

In an example, the power supply device can be a quick-charging power supply device and a non-quick-charging power supply device. An output voltage that the quick-charging power supply device is able to provide is higher than an output voltage that the non-quick-charging power supply device is able to provide. For example, an output voltage/an output current of the non-quick-charging power supply device is 5V/2 A, and an output voltage/an output current of the quick-charging power supply device is 15V/2 A.

When the power supply device is the quick-charging power supply device, a voltage provided to the wireless charging apparatus by the power supply device can make the wireless charging apparatus be operable in the first charging mode. When the power supply device is the non-quick-charging power supply device, the voltage provided to the wireless charging apparatus by the power supply device can make the wireless charging apparatus be operable in the second charging mode.

In an implementation, the wireless charging apparatus communicates with the power supply device to determine a type of the power supply device, communicates with the device to-be-charged in the communication manner given above to determine a charging mode in which the device to-be-charged is operable, and determines a charging mode for use according to the type of the power supply device and/or the charging mode in which the device to-be-charged is operable.

In an implementation, when the power supply device is the non-quick-charging power supply device and the device to-be-charged is operable in the first charging mode, the wireless charging apparatus can convert, with the voltage converting circuit 203, a voltage provided by the power supply device to enable the first charging mode.

In another example, when the power supply device is the quick-charging power supply device and the device to-be-charged is operable in the first charging mode, if a voltage provided by the power supply device is unable to meet requirements of the wireless transmitting circuit 201 (that is, requirements on voltage of the wireless transmitting circuit 201 in the first charging mode), the wireless charging apparatus can still convert, with the voltage converting circuit 203, the voltage provided by the power supply device to enable the first charging mode.

In another example, when the power supply device is the quick-charging power supply device but the device to-be-charged is operable only in the second charging mode (for example, the device to-be-charged includes only the second charging channel 308), the voltage converting circuit 203 can convert the voltage provided by the power supply device (for example, decrease the voltage provided by the power supply device) to enable the second charging mode.

In another example, when the power supply device is the non-quick-charging power supply device and the device to-be-charged is operable in the second charging mode, the wireless charging apparatus determines to enable the second charging mode.

When the wireless charging apparatus charges the battery 305 of the device to-be-charged in the first charging mode, in order to solve problems of heating and low charging efficiency due to use of a wireless charging manner of low-voltage and large-current in the related art, implementations of the disclosure adopt a wireless charging manner of high-voltage and small-current to reduce heating and improve charging efficiency.

In an example, the wireless charging apparatus is provided with the voltage converting circuit 203. The device to-be-charged is provided with the first charging channel 306 (such as a wire) coupled with the battery 305. The first charging channel 306 is provided with the step-down circuit 303 configured to decrease the output voltage of the wireless receiving circuit 301 to make an output voltage and an output current of the first charging channel 306 meet charging requirements of the battery 305.

In an example, the wireless charging apparatus 200 uses a 20 W output power to charge the battery 305 with one single cell of the device to-be-charged. In this case, when the battery 305 with one single cell is charged through the second charging channel 308, an input voltage of the wireless transmitting circuit 201 is required to be 5V, and an input current of the wireless transmitting circuit 201 is required to be 4 A. However, a 4 A current used will certainly result in heating of a coil, which reduces charging efficiency.

When the battery 305 with one single cell is charged through the first charging channel 306, since the first charging channel 306 is provided with the step-down circuit 303, under a condition that the transmission power of the wireless transmitting circuit 201 remains unchanged (the above-mentioned 20 W), the input voltage of the wireless transmitting circuit 201 can be increased, such that the input current of the wireless transmitting circuit 201 can be decreased.

In an example, the step-down circuit 303 is a half voltage circuit, that is, an input voltage of the step-down circuit 303 is twice the output voltage of the step-down circuit 303, thereby further reducing heating of the step-down circuit 303.

As an example, the step-down circuit 303 is the half voltage circuit. In this case, the input voltage of the wireless transmitting circuit 201 is 10V, and the input current of the wireless transmitting circuit 201 is 2 A. As such, the output voltage of the wireless receiving circuit 301 is 10V (it should be understood that, considering electrical power loss, an actual output voltage of the wireless receiving circuit 301 will be close to 10V). Through voltage decrease by the step-down circuit 303, the output voltage of the first charging channel 306 is 5V to charge the battery 305. It is to be understood that, in this example, the voltage required by the battery 305 is 5V. In practice, when the battery 305 is charged, the second control circuit 302 feeds back the output voltage and/or the output current of the step-down 303 detected in real time by the detecting circuit 304 to the first control circuit 202. The first control circuit 202 adjusts, according to the output voltage and/or the output current fed back, the output power of the wireless transmitting circuit 201 to make a voltage difference between the input voltage of the step-down 303 and the output voltage of the step-down 303 satisfy a preset condition.

In implementations of the disclosure, the manner in which the wireless charging apparatus 200 adjusts the output power of the wireless transmitting circuit 201 can be various, which may include any one or more of the following three manners.

(1) Under a condition that a voltage input into the wireless transmitting circuit 201 has a fixed magnitude or constant, the output power of the wireless transmitting circuit 201 is adjusted by adjusting a tuning frequency of a resonant circuit and/or a duty ratio of a switch transistor of an inverter circuit.

(2) The output power of the wireless transmitting circuit 201 is adjusted by adjusting an output voltage of the voltage converting circuit 203 (that is, the voltage input into the wireless transmitting circuit 201).

(3) When the voltage converting circuit 203 illustrated in FIG. 1 is removed, the output power of the wireless transmitting circuit 201 is adjusted by adjusting an output voltage of the power supply device (that is, a voltage input into the wireless charging apparatus).

For instance, the above preset condition is that the input voltage of the step-down circuit 303 is twice the output voltage of the step-down circuit 303. As such, if manner (2) described above is adopted for adjusting the output power of the wireless transmitting circuit 201, when the output voltage of the step-down circuit 303 is detected to be D1V, the first control circuit 202 controls to make the input voltage of the step-down circuit 303 be 2*D1V (it is to be understood that, considering energy loss, an actual input voltage of the step-down circuit 303 can be higher than 2*D1V), such that the voltage difference of the step-down circuit 303 satisfies the preset condition, thereby reducing heating and improving charging efficiency.

When manner (1) described above is adopted and the input voltage of the wireless transmitting circuit 201 is constantly D2, if the output voltage of the step-down circuit 303 is detected to be D1V, the first control circuit 202 determines the tuning frequency or the duty ratio of the switch transistor according to D1 and D2 to make the input voltage of the step-down circuit 303 be 2*D1V (it is to be understood that, considering energy loss, an actual input voltage of the step-down circuit 303 can be higher than 2*D1V).

When manner (3) described above is adopted, if the output voltage of the step-down circuit 303 is detected to be D1V, the first control circuit 202 communicates with the power supply device according to D1 to make a voltage that the power supply device provides to the wireless transmitting circuit 201 be 2*D1V to make the output voltage of the wireless transmitting circuit 201 be 2*D1V (it is to be understood that, considering energy loss, an actual output voltage of the wireless transmitting circuit 201 can be higher than 2*D1V), such that the input voltage of the step-down circuit 303 is 2*D1V.

The manner of communication between the first control circuit 202 and the power supply device is no limited herein. As an example, the first control circuit 202 can be coupled with and communicate with the power supply device via another communication interface other than a charging interface. As another example, the first control circuit 202 can communicate with the power supply device in a wireless manner. For example, the first control circuit 202 can conduct an NFC with the power supply device. As yet another example, the first control circuit 202 can communicate with the power supply device via the charging interface without providing any extra communication interface or another wireless communication module, which can simplify the implementation of the wireless charging apparatus. For instance, the charging interface is a universal serial bus (USB) interface. The first control circuit 202 can communicate with the power supply device via a data line (such as a D+ line and/or a D− line) of the USB interface. For another instance, the charging interface is a USB interface supporting a power delivery (PD) communication protocol (such as a USB TYPE-C interface). The first control circuit 202 can communicate with the power supply device based on the PD communication protocol.

The manner in which the power supply device adjusts its own output power is not limited herein. For example, the power supply device can be provided with a voltage feedback loop and a current feedback loop to adjust the output voltage and/or the output current of the power supply device according to actual needs.

In an example, the wireless charging apparatus 200 can be in various shapes, such as a circular shape, a rectangular shape, etc. When the device to-be-charged is placed on a charging surface (a surface provided with a transmitting coil) of the wireless charging apparatus 200, the wireless charging apparatus 200 begins wireless charging in a wireless charging procedure illustrated in FIG. 6.

Figure 6:
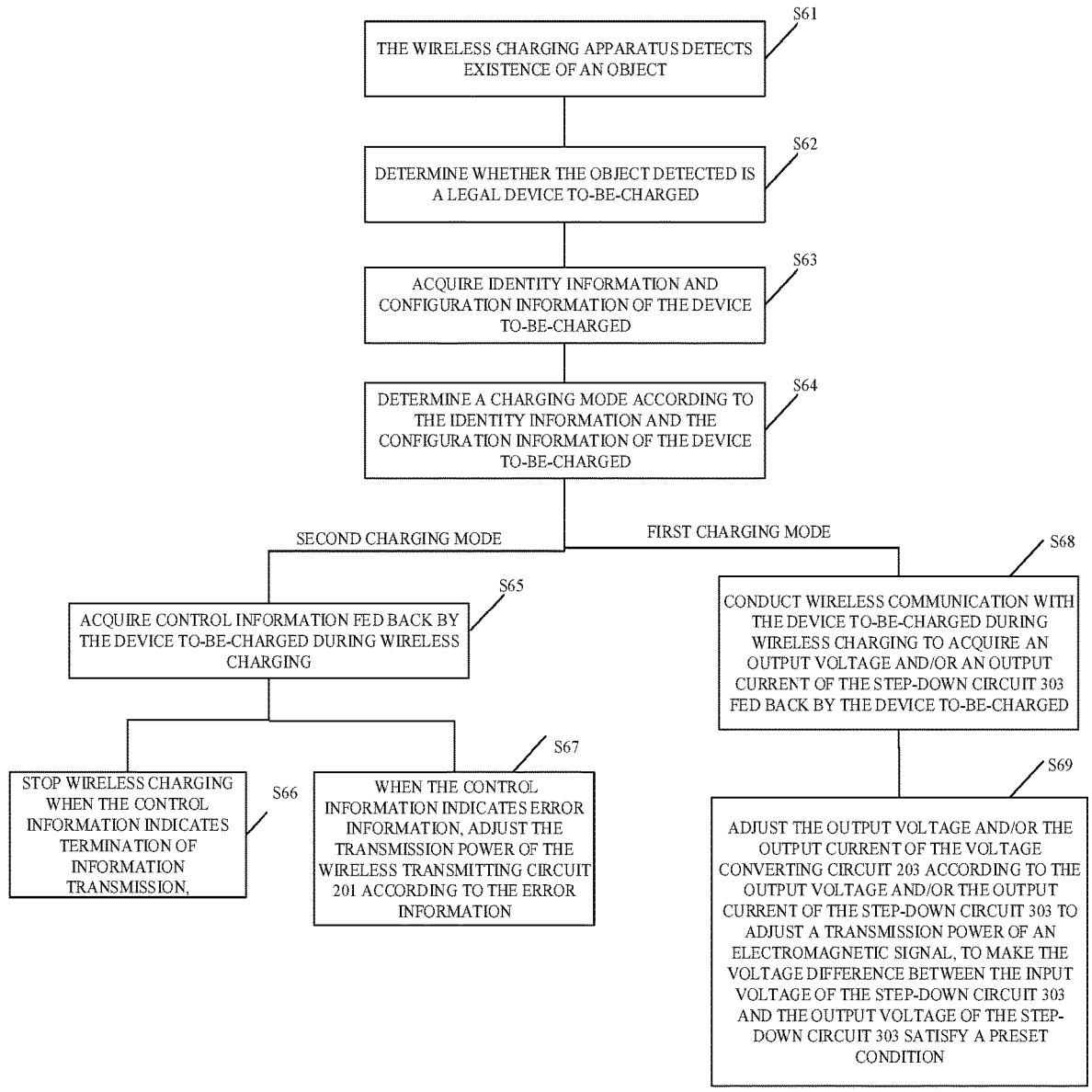
FIG. 6 is a schematic flowchart of wireless charging according to an implementation of the present disclosure.

FIG. 6 is a schematic flowchart of wireless charging according to an implementation of the present disclosure.

At S61, the wireless charging apparatus detects existence of an object.

For example, the wireless charging apparatus transmits a signal at a preset time interval to detect whether an object is placed on a surface of the wireless charging apparatus.

At S62, the wireless charging apparatus determines whether the object detected is a legal (that is, proper) device to-be-charged.

At S63, the wireless charging apparatus acquires identity information and configuration information of the device to-be-charged.

For example, the identity information may be the identification code of the device to-be-charged described above. The configuration information may be the type or model of the device to-be-charged described above.

At S64, the wireless charging apparatus determines a charging mode according to the identity information and the configuration information of the device to-be-charged.

For example, the charging mode can be determined in the above manner, that is, determined according to the type of the power supply device and/or the charging mode in which the device to-be-charged is operable.

In implementations of the disclosure, when the second charging mode is determined to be enabled, wireless charging at S65 to S67 is conducted. When the first charging mode is determined to be used, wireless charging at S68 to S69 is conducted.

At S65, control information fed back by the device to-be-charged is acquired during wireless charging.

In an example, as mentioned above, the second control circuit 302 of the device to-be-charged can couple a data package signal including the control information to the coil of the wireless receiving circuit 301 to transmit the data package signal to the coil of the wireless transmitting circuit 201 and then to the first controller of the wireless charging apparatus. The control information can include the error value described above.

At S66, when the control information indicates termination of information transmission, stop wireless charging.

At S67, when the control information indicates error information, the transmission power of the wireless transmitting circuit 201 is adjusted according to the error information.

For example, the transmission power can be adjusted in the manner (1) or (3) described above.

At S68, conduct wireless communication with the device to-be-charged during wireless charging to acquire the output voltage and/or the output current of the step-down circuit 303 fed back by the device to-be-charged.

At S69, the output voltage and/or the output current of the voltage converting circuit 203 is adjusted according to the output voltage and/or the output current of the step-down circuit 303 to adjust a transmission power of an electromagnetic signal, to make the voltage difference between the input voltage of the step-down circuit 303 and the output voltage of the step-down circuit 303 satisfy the preset condition.

For example, the transmission power can be adjusted in any one or more of the above manners (1) to (3).

It should be understood that, no matter whether the first charging mode or the second charging mode is enabled, the wireless charging will stop if a charging stop condition is satisfied. For example, when the device to-be-charged is detected to have left the charging surface, the charging stop condition is satisfied. Alternatively, when a charging process is detected to experience abnormality (such as over-voltage, over-current, or over-temperature in the charging process), the charging stop condition is satisfied.

In an example, when the first charging mode is enabled, the output voltage of the wireless receiving circuit 301 of the device to-be-charged depends on the output voltage of the voltage converting circuit 203. In an example, by decreasing the voltage difference between the input voltage of the step-down circuit 303 and the output voltage of the step-down circuit 303, working efficiency of the step-down circuit 303 can be improved and temperature rise can be reduced. In an example, since the input voltage of the step-down circuit 303 depends on an input voltage of the wireless receiving circuit 301, the voltage difference of the step-down circuit 303 can be decreased by decreasing the input voltage of the wireless receiving circuit 301.

It is to be understood that, the wireless charging apparatus and/or the device to-be-charged in implementations of the disclosure can be operable only in the first charging mode for wireless charging, or be operable in the first charging mode or in the second charging mode for wireless charging, which is not limited herein.

In an example, in order to keep a charging voltage of the battery 305 constant, if the input voltage of the wireless receiving circuit 301 is decreased, it is necessary to increase an input current of the wireless receiving circuit 301, and increase in input current will result in increase in current in the receiving coil, which in turn makes temperature rise of the receiving coil more serious. Therefore, the first control circuit 202 of the wireless charging apparatus in implementations of the disclosure can be further configured to adjust the output voltage of the voltage converting circuit 203 according to the output current of the step-down circuit 303 fed back by the device to-be-charged and a preset current threshold.

In an example, the current threshold includes a first current threshold and a second current threshold, where the first current threshold is greater than the second current threshold. The first control circuit 202 is configured to control to increase the output voltage of the voltage converting circuit 203 when the output current of the step-down circuit 303 is larger than the first current threshold and configured to control to decrease the output voltage of the voltage converting circuit 203 when the output current of the step-down circuit 303 is smaller than the second current threshold.

It is to be understood that, under a condition of a constant transmission power, when the output current of the step-down circuit 303 is larger than the first current threshold, even if the voltage difference of the step-down circuit 303 satisfies the preset condition, heating of the receiving coil will occur due to excessively large current in the receiving coil. Therefore, by controlling to increase the output voltage of the voltage converting circuit 203, the output current of the step-down circuit 303 will be decreased, which is beneficial to reducing heating of the receiving coil. However, when the output current of the step-down circuit 303 is smaller than the second current threshold, the voltage difference of the step-down circuit 303 will increase, which results in heating of the step-down circuit 303. Therefore, by controlling to decrease the output voltage of the voltage converting circuit 203, the voltage difference of the step-down circuit 303 will be decreased, which can reduce heating of the step-down circuit 303.

In an example, a temperature rise model database can be established according to data in a debugging stage or data obtained through multiple tests, to determine a maximum current threshold allowed in a charging coil (that is, the first current threshold described above) and to determine the second current threshold described above.

In an example, the first control circuit 202 of the wireless charging apparatus is further configured to adjust the output voltage of the voltage converting circuit 203 according to the output voltage of the step-down circuit 303 fed back by the device to-be-charged and a preset correspondence relationship between the voltage difference and the charging efficiency.

In another example, a voltage difference when the step-down circuit 303 operates at an optimum (for example, maximum) efficiency can be obtained by debugging and testing according to working characteristics of the step-down circuit 303 to determine the correspondence relationship between the voltage difference and the charging efficiency. The charging efficiency can be reflected by temperature rise, for example, the charging efficiency is in an inverse proportion to temperature rise, that is, a higher charging efficiency corresponds to a smaller temperature rise.

In an example, the voltage difference can also be a voltage difference between an input voltage of the battery 305 and the output voltage of the voltage converting circuit 203. It should be understood that, in some examples, the voltage difference of the step-down circuit can also be obtained according to the voltage of the battery and any one of the following voltages: the output voltage of the wireless transmitting circuit, the output voltage of the wireless receiving circuit, the input voltage of the step-down circuit, and the output voltage of the voltage converting circuit.

Therefore, the output voltage of the voltage converting circuit 203 can be adjusted according to the voltage difference of the step-down circuit 303 and the above correspondence relationship to reach the maximum charging efficiency. Alternatively, the input voltage of the battery 305 can be determined according to the output voltage of the step-down circuit fed back. Then the output voltage of the voltage converting circuit 203 can be adjusted according to the voltage difference between the input voltage of the battery 305 determined and the output voltage of the voltage converting circuit 203 and the above correspondence relationship to reach the maximum charging efficiency.

In an example, the above two manners for adjusting the output voltage of the voltage converting circuit 203 can be combined, that is, the output voltage of the voltage converting circuit 203 is adjusted to be a first voltage according to the output voltage of the step-down circuit 303 fed back by the device to-be-charged and the preset correspondence relationship between the voltage difference and the charging efficiency, and after the output voltage of the voltage converting circuit 203 is adjusted to be the first voltage, the output voltage of the voltage converting circuit 203 is adjusted to be a second voltage according to the output current of the step-down circuit 303 fed back by the device to-be-charged and the preset current threshold. In this way, both a rough adjustment and a fine adjustment can be made to the output voltage of the voltage converting circuit 203, thereby ensuring accuracy of adjustment.

Figure 7:
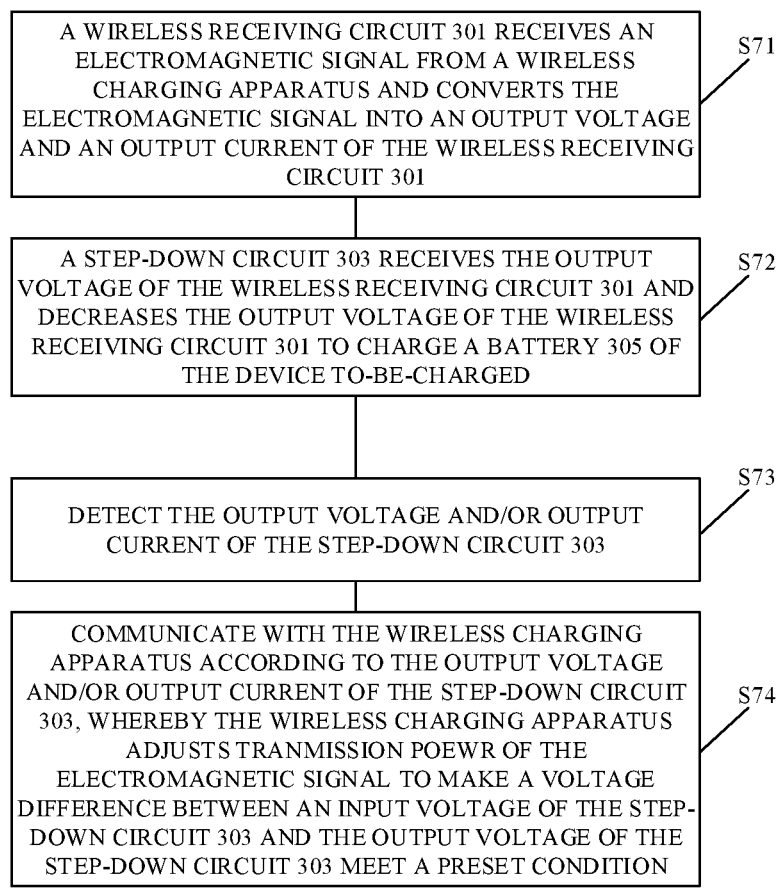
FIG. 7 is a schematic flowchart of a wireless charging method according to an implementation of the present disclosure.

FIG. 7 is a schematic flowchart of a wireless charging method according to an implementation of the present disclosure. The wireless charging method is applicable to a device to-be-charged.

At S71, a wireless receiving circuit 301 receives an electromagnetic signal from a wireless charging apparatus and converts the electromagnetic signal into an output voltage and an output current of the wireless receiving circuit 301.

At S72, a step-down circuit 303 receives the output voltage of the wireless receiving circuit 301 and decreases the output voltage of the wireless receiving circuit 301 to charge a battery 305 of the device to-be-charged.

At S73, an output voltage and/or output current of the step-down circuit 303 is detected.

At S74, communicate with the wireless charging apparatus according to the output voltage and/or the output current of the step-down circuit 303, whereby the wireless charging apparatus adjusts a transmission power of the electromagnetic signal to make a voltage difference between an input voltage of the step-down circuit 303 and the output voltage of the step-down circuit 303 meet a preset condition.

In an example, communicating with the wireless charging apparatus according to an output voltage and/or an output current of the step-down circuit 303 detected includes the following. Adjustment information is sent to the wireless charging apparatus according to the output voltage and/or the output current of the step-down circuit 303 detected, where the adjustment information is used for instructing the wireless charging apparatus to conduct voltage adjustment and/or current adjustment on electrical power received from a power supply device to adjust a transmission power of the electromagnetic signal.

In an implementation, the wireless charging method includes the following. A converting circuit 307 receives the output voltage and the output current of the wireless receiving circuit 301 and conducts a constant-voltage control and/or a constant-current control on the output voltage and/or the output current of the wireless receiving circuit 301 to charge the battery 305. Communicate with the wireless charging apparatus to determine to control one of the step-down circuit 303 and the converting circuit 307 to work.

Figure 8:
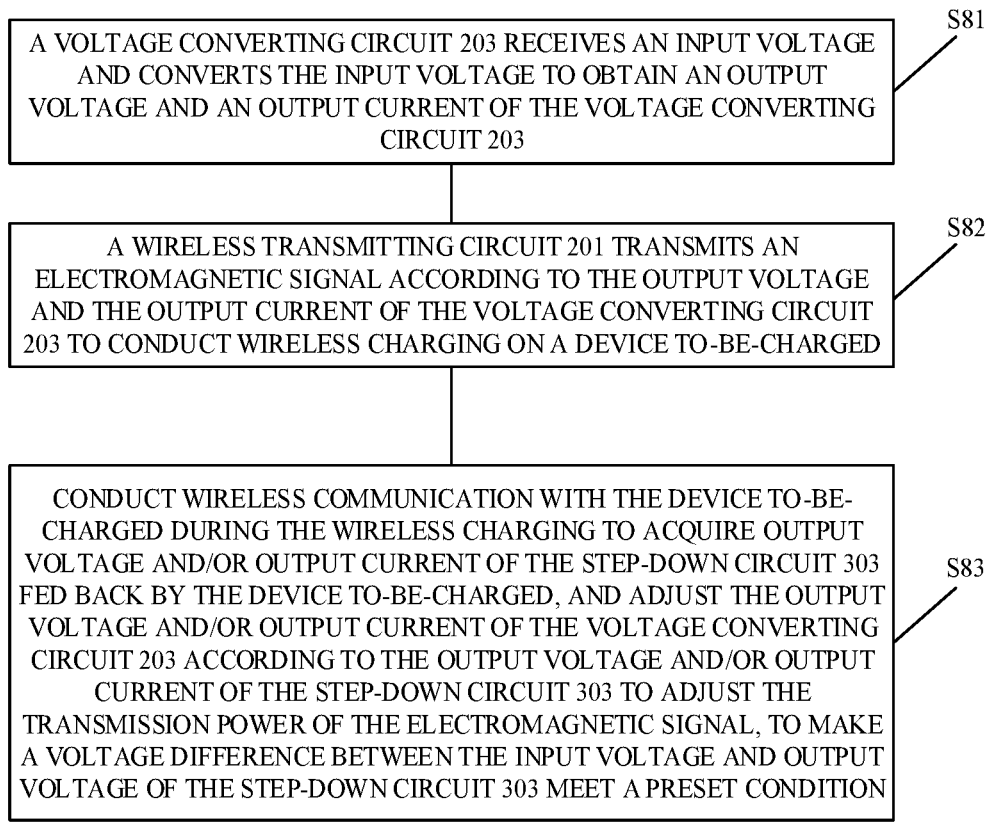
FIG. 8 is a schematic flowchart of a wireless charging method according to another implementation of the present disclosure.

FIG. 8 is a schematic flowchart of a wireless charging method according to an implementation of the present disclosure. The wireless charging method is applicable to a wireless charging apparatus.

At S81, a voltage converting circuit 203 receives an input voltage and converts the input voltage to obtain an output voltage and an output current of the voltage converting circuit 203.

At S82, a wireless transmitting circuit 201 transmits an electromagnetic signal according to the output voltage and the output current of the voltage converting circuit 203 to conduct wireless charging on a device to-be-charged.

At S83, conduct wireless communication with the device to-be-charged during the wireless charging to acquire an output voltage and an output current of a step-down circuit 303 fed back by the device to-be-charged, and adjust at least one of the output voltage and the output current of the voltage converting circuit 203 according to at least one of the output voltage and the output current of the step-down circuit 303 to adjust a transmission power of the electromagnetic signal, to make a voltage difference between an input voltage of the step-down circuit 303 and the output voltage of the step-down circuit 303 meet a preset condition.

It should be understood that, details of operations in the above methods have been described in foregoing implementations, which will not be repeated herein.

In implementations of the disclosure, charging on the battery 305 through the first charging channel 306 or through the second charging channel 308 includes a trickle charging stage, a constant-current charging stage, and a constant-voltage charging stage. It is to be noted that, the constant-current charging stage referred to herein does not require that the charging current remain completely constant, and may be, for example, a peak value (that is, peak current) or an average value of the charging current remaining constant within a certain time period. Practically, in the constant-current charging stage, a multi-stage constant current charging manner is usually adopted for charging.

Multi-stage constant current charging can include N constant-current stages, where N is an integer not less than two (N>=2). In the multi-stage constant current charging, a first stage of charging begins with a pre-determined charging current. The N constant-current stages of the multi-stage constant current charging are executed in sequence from the first stage to the $N^{th}$ stage. When a previous constant-current stage ends and a next constant-current stage begins, the charging current may be decreased. When a voltage of the battery 305 reaches a threshold of charging cut-off voltage, the multi-stage constant current charging proceeds to a subsequent constant-current stage, that is, the previous constant-current stage ends and the next constant-current stage begins. Current conversion between two adjacent constant-current stages may be gradual or in a step-like manner.

The manner and order of communication between the wireless charging apparatus and the device to-be-charged are not limited herein.

In some examples, the wireless communication between the wireless charging apparatus and the device to-be-charged (or between the second control circuit 302 and the first control circuit 202) is a one-way wireless communication.

For example, during wireless charging of the battery 305, it can be specified that the device to-be-charged is an initiator of communication and the wireless charging apparatus is a receiver of communication. Exemplarily, in the constant-current charging stage of the battery 305, the device to-be-charged can detect in real time the charging current of the battery 305 (that is, the output current of the wireless receiving circuit 301) through the detecting circuit 304. When the charging current of the battery 305 does not match a charging current currently required by the battery 305, the device to-be-charged can send adjustment information to the wireless charging apparatus to instruct the wireless charging apparatus to adjust the transmission power of the wireless transmitting circuit 201.

In some examples, the wireless communication between the wireless charging apparatus and the device to-be-charged (or between the second control circuit 302 and the first control circuit 202) is a two-way wireless communication. The two-way wireless communication generally requires that the receiver sends response information to the initiator after receiving communication request initiated by the initiator. Two-way communication mechanism can make communication safer.

Description above does not limit master-slave relationship between the wireless charging apparatus (or the first control circuit 202 of the wireless charging apparatus) and the device to-be-charged (or the second control circuit 302 of the device to-be-charged). That is to say, any one of the wireless charging apparatus and the device to-be-charged can function as a master device to initiate a two-way communication, and correspondingly the other one of the wireless charging apparatus and the device to-be-charged can function as a slave device to make a first response or a first reply to the communication initiated by the master device. Optionally, the master device and the slave device can be determined by comparing link states between the wireless charging apparatus and the device to-be-charged. For example, suppose a wireless link in which the wireless charging apparatus sends information to the device to-be-charged is an uplink and a wireless link in which the device to-be-charged sends information to the wireless charging apparatus is a downlink. When the uplink is of higher quality, the wireless charging apparatus can be determined as the master device of communication. When the downlink is of higher quality, the device to-be-charged can be determined as the master device of communication.

The manner in which the two-way communication between the wireless charging apparatus and the device to-be-charged is implemented is not limited herein. That is to say, any one of the wireless charging apparatus and the device to-be-charged can function as the master device to initiate the two-way communication, and correspondingly the other one of the wireless charging apparatus and the device to-be-charged can function as the slave device to make the first response or the first reply to the communication initiated by the master device. Besides, the master device can make a second response to the first response or the first reply of the slave device, and as such, the master device and the slave device complete one communication negotiation.

The master device can make the second response to the first response or the first reply of the slave device as follows. The master device receives from the slave device the first response or the first reply to the communication and makes the second response to the first response or the first reply of the slave device.

The master device can also make the second response to the first response or the first reply of the slave device as follows. When the master device fails to receive from the slave device the first response or the first reply to the communication within a preset time period, the master device can still make the second response to the first response or the first reply made by the slave device.

In some examples, after the device to-be-charged, as the master device, initiates the communication and the wireless charging apparatus, as the slave device, makes the first response or the first reply to the communication initiated by the master device, it can be considered that the wireless charging apparatus and the device to-be-charged have completed a communication negotiation without requiring the device to-be-charged to make the second response to the first response or the first reply of the wireless charging apparatus.

The manner of wireless communication between the first control circuit 202 of the wireless charging apparatus and the second control circuit 302 of the device to-be-charged is not limited herein. As an example, the first control circuit 202 can conduct wireless communication with the second control circuit 302 based on Bluetooth, Wi-Fi, or backscatter modulation (or power load modulation).

As pointed above, during the wireless charging, the second control circuit 302 can be configured to conduct the wireless communication with the first control circuit 202 according to a voltage and/or a current in the first charging channel 306 detected by the detecting circuit 304, whereby the first control circuit 202 adjusts the transmission power of the wireless transmitting circuit 201. However, contents communicated between the second control circuit 302 and the first control circuit 202 is not limited herein.

As an example, the second control circuit 302 can send to the first control circuit 202 the output voltage and/or the output current of the first charging channel 306 detected by the detecting circuit 304. In addition, the second control circuit 302 can further send state information of the battery 305 to the first control circuit 202. The state information of the battery 305 includes a present power and/or a present voltage of the battery 305 of the device to-be-charged. The first control circuit 202 can determine a present charging stage of the battery 305 according to the state information of the battery 305, to further determine a target charging voltage and/or a target charging current that matches a charging voltage and/or the charging current currently required by the battery 305. Then the first control circuit 202 can compare the output voltage and/or the output current of the first charging channel 306 received from the second control circuit 302 with the above target charging voltage and/or the above target charging current to determine whether the output voltage and/or the output current of the first charging channel 306 matches the charging voltage and/or the charging current currently required by the battery 305. When the output voltage and/or the output current of the first charging channel 306 does not match the charging voltage and/or the charging current currently required by the battery 305, the first control circuit 202 can adjust the transmission power of the wireless transmitting circuit 201 until the output voltage and/or the output current of the first charging channel 306 matches the charging voltage and/or the charging current currently required by the battery 305.

As another example, the second control circuit 302 can send adjustment information to the first control circuit 202 to instruct the first control circuit 202 to adjust the transmission power of the wireless transmitting circuit 201. For example, the second control circuit 302 can instruct the first control circuit 202 to increase the transmission power of the wireless transmitting circuit 201. For another example, the second control circuit 302 can instruct the first control circuit 202 to reduce the transmission power of the wireless transmitting circuit 201. Specifically, the wireless charging apparatus can set the transmission power of the wireless transmitting circuit 201 to have multiple grades. Each time the first control circuit 202 receives the adjustment information, the first control circuit 202 adjusts the transmission power of the wireless transmitting circuit 201 by one grade until the output voltage and/or the output current of the first charging channel 306 matches the charging voltage and/or the charging current currently required by the battery 305.

Besides the above communication content, the first control circuit 202 and the second control circuit 302 can also exchange other types of communication information. In some examples, the first control circuit 202 and the second control circuit 302 can exchange information for safety protection, abnormality detection, or fault handling, such as temperature information of the battery 305, information indicative of over-voltage protection or over-current protection, etc., or power-transmission efficiency information (for indicating efficiency in power transmission between the wireless transmitting circuit 201 and the wireless receiving circuit 301).

For example, when the temperature of the battery 305 is excessively high, the first control circuit 202 and/or the second control circuit 302 can control a charging loop to a protection state, such as controlling the charging loop to stop the wireless charging. For another example, after receiving the information indicative of over-voltage protection or over-current protection from the second control circuit 302, the first control circuit 202 can reduce the transmission power, or control the wireless transmitting circuit 201 to stop working. For yet another example, after receiving the power-transmission efficiency information from the second control circuit 302, the first control circuit 202 can control the wireless transmitting circuit 201 to stop working if power-transmission efficiency is lower than a preset threshold and notify a user of the event. Exemplarily, the fact that the power-transmission efficiency is excessively low can be displayed via a display screen, or be indicated by an indicator lamp in order for the user to adjust wireless charging environment.

In some examples, the first control circuit 202 and the second control circuit 302 can exchange other types of information for adjusting the transmission power of the wireless transmitting circuit 201, such as the temperature information of the battery 305, information indicative of a peak value or an average value of the voltage in the first charging channel 306, information indicative a peak value or an average value of the current in the first charging channel 306, the power-transmission efficiency information (indicative of efficiency in power transmission between the wireless transmitting circuit 201 and the wireless receiving circuit 301), etc.

For instance, the second control circuit 302 can send the power-transmission efficiency information to the first control circuit 202. The first control circuit 202 can be further configured to determine an adjustment range of the transmission power of the wireless transmitting circuit 201 according to the power-transmission efficiency information. Specifically, when the power-transmission efficiency information indicates that the efficiency in power transmission between the wireless transmitting circuit 201 and the wireless receiving circuit 301 is low, the first control circuit 202 can increase the adjustment range of the transmission power of the wireless transmitting circuit 201 to make the transmission power of the wireless transmitting circuit 201 reach promptly a target power.

For another instance, when the output voltage and/or the output current of the wireless receiving circuit 301 is a pulsating waveform voltage and/or a pulsating waveform current, the second control circuit 302 can send at least one of the information indicative of a peak value or an average value of the output voltage of the first charging channel 306 and the information indicative of a peak value or an average value of the output current of the first charging channel 306 to the first control circuit 202. The first control circuit 202 can determine whether the peak value or the average value of the output voltage and/or the output current of the first charging channel 306 matches the charging voltage and/or the charging current currently required by the battery 305. When the peak value or the average value of the output voltage and/or the output current of the first charging channel 306 does not match the charging voltage and/or the charging current currently required by the battery 305, the first control circuit 202 will adjust the transmission power of the wireless transmitting circuit 201.

For yet another instance, the second control circuit 302 can send the temperature information of the battery 305 to the first control circuit 202. When a temperature of the battery 305 is excessively high, the first control circuit 202 will reduce the transmission power of the wireless transmitting circuit 201 to decrease the output current of the wireless receiving circuit 301, thereby reducing the temperature of the battery 305.

Exemplary implementations of the disclosure has been described in detail above in connection with the accompanying drawings. However, the present disclosure is not limited to the details of the above implementations. Various simple modifications can be made to the technical solution of the disclosure within the scope of the technical concept of the disclosure, and such simple modifications shall be within the protection scope of the present disclosure.

In addition, it is to be noted that, all the technical features described in the above implementations can be combined with each other in any proper manner without conflict. In order to avoid unnecessary repetition, various manners of combination will not be elaborated in the disclosure.

Furthermore, various implementations of the disclosure can also be randomly combined without departing from the spirit of the present disclosure, and such combination should also be regarded as content disclosed by the present disclosure.

What is claimed is:

1. A wireless charging apparatus, comprising:
    a voltage converting circuit, configured to receive an input voltage and convert the input voltage to obtain an output voltage and an output current of the voltage converting circuit;
    a wireless transmitting circuit, configured to transmit an electromagnetic signal according to the output voltage and the output current of the voltage converting circuit to conduct wireless charging on a device to-be-charged; and
    a first control circuit, configured for wireless communication with the device to-be-charged during the wireless charging to acquire at least one of an output voltage and an output current of a step-down circuit fed back by the device to-be-charged, and adjust at least one of the output voltage and the output current of the voltage converting circuit according to at least one of the output voltage and the output current of the step-down circuit to adjust a transmission power of the electromagnetic signal, to make a voltage difference between an input voltage of the step-down circuit and the output voltage of the step-down circuit meet a preset condition, wherein the first control circuit is configured to increase the output voltage of the voltage converting circuit when the output current of the step-down circuit is larger than a first threshold current and decrease the output voltage of the voltage converting circuit when the output current of the step-down circuit is smaller than a second threshold current, wherein the second threshold current is larger than the first threshold current.

2. The wireless charging apparatus of claim 1, wherein the first control circuit is further configured to adjust the output voltage of the voltage converting circuit according to the output voltage of the step-down circuit fed back by the device to-be-charged and a correspondence relationship between voltage differences and charging efficiencies.

3. The wireless charging apparatus of claim 1, wherein the first control circuit is further configured to:
adjust, according to the output voltage of the step-down circuit fed back by the device to-be-charged and a correspondence relationship between voltage differences and charging efficiencies, the output voltage of the voltage converting circuit to a first voltage, and
adjust, according to the output current of the step-down circuit fed back by the device to-be-charged and a preset threshold current, the first voltage of the voltage converting circuit to a second voltage.

4. The wireless charging apparatus of claim 1, wherein
the voltage converting circuit is coupled with an external power supply device; and
the first control circuit is further configured to communicate with the external power supply device to make the external power supply device adjust, according to at least one of the output voltage and output current of the step-down circuit, at least one of a voltage value and a current value of a current provided to the voltage converting circuit.

5. The wireless charging apparatus of claim 1, wherein the first control circuit is further configured to communicate with the device to-be-charged to determine a charging mode, wherein the charging mode comprises a first charging mode and a second charging mode, and a maximum transmission power of the wireless transmitting circuit in the first charging mode is higher than that in the second charging mode.

6. The wireless charging apparatus of claim 1, further comprising:
rectifier-filter circuit, configured to covert an alternating current (AC) voltage received from a power supply device into a direct current (DC) voltage; and
a DC-DC converter, configured to adjust the DC voltage outputted at the rectifier-filter circuit to a fixed magnitude and provide the voltage adjusted as the input voltage to the voltage converting circuit.

7. The wireless charging apparatus of claim 1, further comprising:
a power storage module, configured to store electrical power obtained from outside and provide the electrical power stored to the wireless transmitting circuit; wherein
the wireless transmitting circuit is further configured to generate the electromagnetic signal according to the electrical power received from the power storage module.

8. A device to-be-charged, comprising:
a battery;
a wireless receiving circuit, configured to receive an electromagnetic signal from a wireless charging apparatus and convert the electromagnetic signal into an output voltage and an output current of the wireless receiving circuit;
a step-down circuit, configured to receive the output voltage of the wireless receiving circuit and decrease the output voltage of the wireless receiving circuit to charge the battery;
a detecting circuit, configured to detect at least one of an output voltage and an output current of the step-down circuit;
a second control circuit, configured to communicate with the wireless charging apparatus according to at least one of the output voltage and the output current of the step-down circuit detected by the detecting circuit, whereby the wireless charging apparatus adjusts a transmission power of the electromagnetic signal to make a voltage difference between an input voltage of the step-down circuit and the output voltage of the step-down circuit meet a preset condition; and
a converting circuit, configured to receive the output voltage and the output current of the wireless receiving circuit and conduct at least one of a constant-voltage control and a constant-current control on at least one of the output voltage and the output current of the wireless receiving circuit to charge the battery,
wherein the second control circuit is further configured to control switching between the step-down circuit and the converting circuit.

9. The device to-be-charged of claim 8, wherein the battery comprises N cells coupled in series, wherein N is a positive integer greater than one.

10. The device to-be-charged of claim 8, wherein the step-down circuit is a Buck circuit or a charge pump.

11. The device to-be-charged of claim 8, wherein the second control circuit is further configured to send, according to at least one of the output voltage and the output current of the step-down circuit detected by the detecting circuit, adjustment information to the wireless charging apparatus, wherein the adjustment information is used for instructing the wireless charging apparatus to conduct at least one of a current adjustment and a voltage adjustment on electrical power received from a power supply device, to adjust a transmission power of the electromagnetic signal.

12. The device to-be-charged of claim 8, wherein the second control circuit is further configured to communicate with the wireless charging apparatus to determine to control one of the step-down circuit and the converting circuit to work.

13. The device to-be-charged of claim 12, wherein the second control circuit is configured to:
communicate with the wireless charging apparatus to determine a charging mode, wherein the charging mode comprises a first charging mode and a second charging mode, and a charging speed in the first charging mode is higher than that in the second charging mode; and
control the step-down circuit to work when the first charging mode is enabled to charge the battery, or control the converting circuit to work when the second charging mode is enabled to charge the battery.

14. The device to-be-charged of claim 8, wherein the second control circuit is further configured to control switching between the step-down circuit and the converting circuit according to a temperature of the battery.

15. The device to-be-charged of claim 8, wherein the output current of the step-down circuit is a constant direct current, a pulsating direct current, or an alternating current.

16. The device to-be-charged of claim 8, wherein the step-down circuit is arranged in a first charging channel, the detecting circuit is configured to detect at least one of a voltage and a current in the first charging channel and provide voltage value and/or current value detected to the second control circuit, and the second control circuit is further configured to provide the voltage value and/or current value detected to the wireless charging apparatus for transmission power adjustment.

17. A method for wireless charging, being applicable to a device to-be-charged, the method comprising:
  receiving, with a wireless receiving circuit, an electromagnetic signal from a wireless charging apparatus and converting the electromagnetic signal into an output voltage and an output current of the wireless receiving circuit;
  receiving, with a step-down circuit, the output voltage of the wireless receiving circuit and decreasing the output voltage of the wireless receiving circuit to charge a battery of the device to-be-charged;
  detecting at least one of an output voltage and an output current of the step-down circuit;
  communicating with the wireless charging apparatus according to at least one of the output voltage and the output current of the step-down circuit detected, whereby the wireless charging apparatus adjusts a transmission power of the electromagnetic signal to make a voltage difference between an input voltage of the step-down circuit and the output voltage of the step-down circuit meet a preset condition; and
  at least one of:
    adjusting, according to the output voltage of the step-down circuit fed back by the device to-be-charged and a correspondence relationship between voltage differences and charging efficiencies, the output voltage of the voltage converting circuit to a first voltage; or
    adjusting, according to the output current of the step-down circuit fed back by the device to-be-charged and a preset threshold current, the first voltage of the voltage converting circuit to a second voltage.

* * * * *